United States Patent Office
2,783,927
Patented Mar. 5, 1957

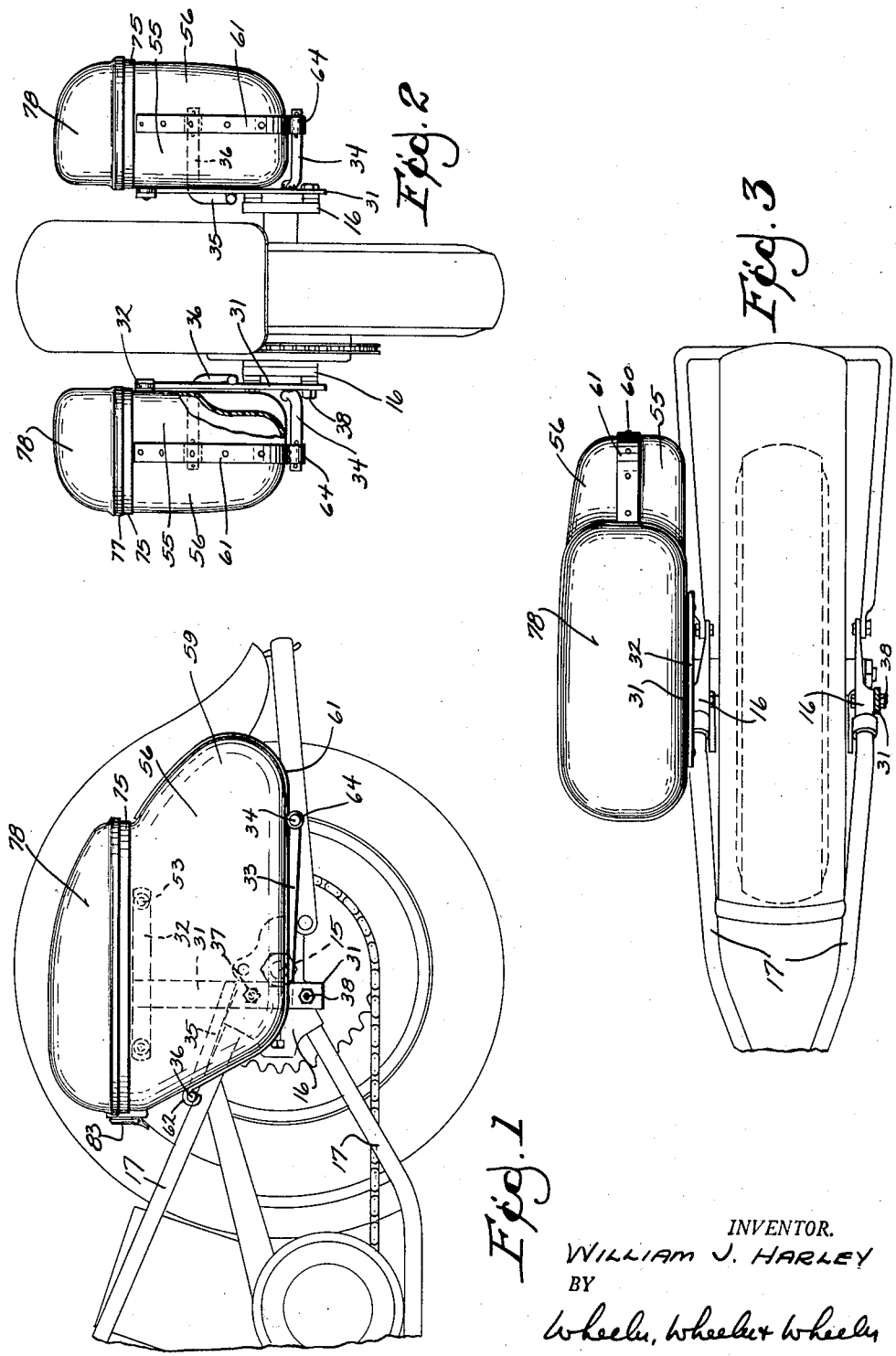

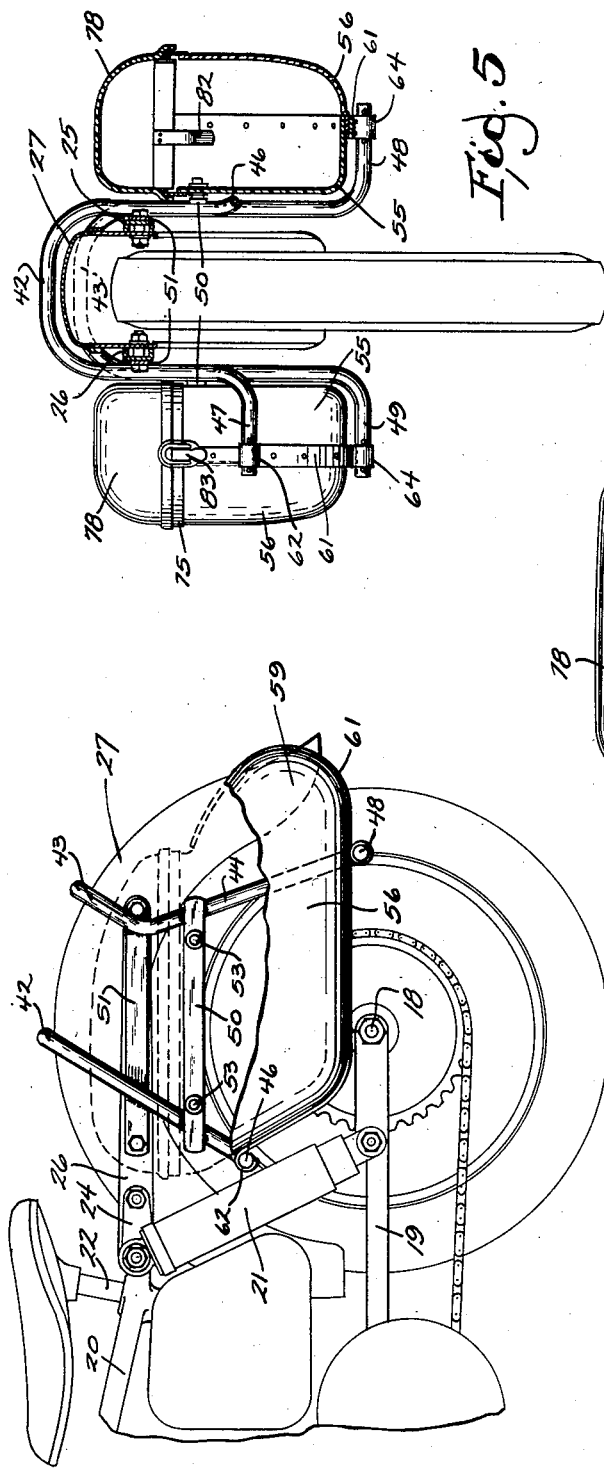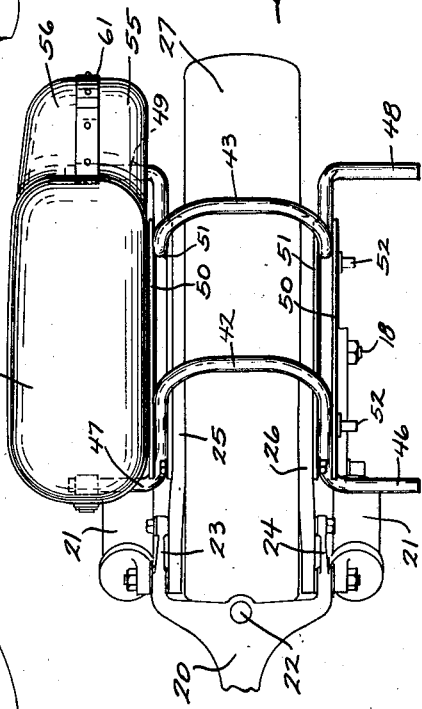

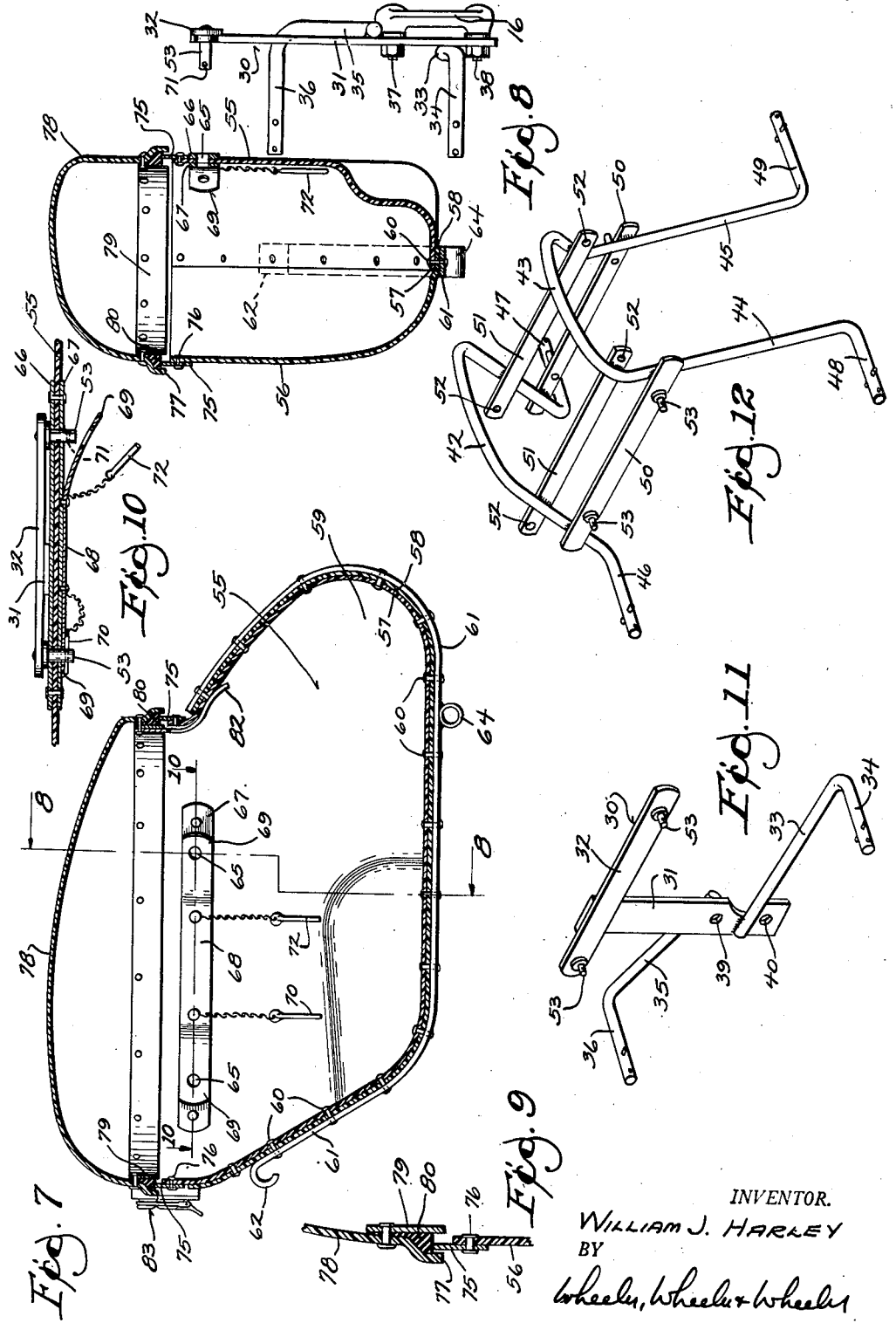

2,783,927

LUGGAGE CARRIERS FOR CYCLES

William J. Harley, Milwaukee, Wis., assignor to Harley-Davidson Motor Co., Milwaukee, Wis., a corporation of Wisconsin Application August 3, 1953, Serial No. 371,996

9 Claims. (Cl. 224—32)

This invention relates to luggage carriers for cycles. It has particular reference to so-called saddlebags for motorcycles and to mounting frames for the support of such saddlebags from differing types of motorcycle structures.

One of the objects of the invention is to provide a standard saddlebag or the like applicable by means of differing mounting brackets to motorcycles of widely differing structure. The improved luggage receptacle or saddlebag is desirably molded in three pieces, two of which form the receptacle and one of which constitutes a closure therefor, the edges of the molded parts having metal reenforcement. One reenforcement strap applied over the lapping joint between component parts of the receptacle includes means for attachment to the respective mounting brackets. Other metal parts respectively applied interiorly and exteriorly of the rims of the receptacle and the closure are mutually offset to cooperate with a gasket secured by one of them and upon which the other seats to provide a tight seal which protects from dust the contents of the luggage carrier or saddlebag.

According to the motorcycle frame construction, the brackets which support my improved luggage carrier or saddlebag may either be mounted individually at opposite sides of the frame to the sidecar attachment bolts or may be carried from fender-supporting rearward extensions of the frame. One pair of mounting brackets herein disclosed has no cross connection, while the brackets of the other pair have an integrating connection over the vehicle fender.

In the drawings:

Fig. 1 is a view in side elevation of a rear portion of a single frame to which is applied a luggage carrier embodying the invention.

Fig. 2 is a view in rear elevation of the parts shown in Fig. 1, portions of the leftside luggage carrier being broken away.

Fig. 3 is a fragmentary plan view of the structure shown in Figs. 1 and 2, the bracket and carrier at the left side of the vehicle being broken away.

Fig. 4 is a view in side elevation showing a modified carrier arrangement used for a different type of cycle frame, the rear half of the latter being illustrated.

Fig. 5 is a view in rear elevation of the parts shown in Fig. 4, the righthand saddlebag and carrier being broken away in transverse section.

Fig. 6 is a fragmentary plan view of the device shown in Figs. 4 and 5, the left side saddlebag being omitted.

Fig. 7 is an enlarged detail view in longitudinal section through a saddlebag type of luggage carrier interchangeably usable in the carrier assemblies shown in Figs. 1 to 3 and Figs. 4 to 6.

Fig. 8 is a view of the saddlebag taken in transverse section on the line 8—8 of Fig. 7, one embodiment of mounting bracket being shown in spaced relation thereto.

Fig. 9 is an enlarged fragmentary detail view of the seal shown in section in Fig. 8.

Fig. 10 is an enlarged detail view taken in horizontal section on the line 10—10 of Fig. 7.

Fig. 11 is a detail view in perspective of one of the brackets used in the structure shown in Figs. 1 to 3.

Fig. 12 is a detail view in perspective of the bracket assembly used in the organization illustrated in Figs. 4 to 6.

The motorcycle shown in Figs. 1 to 3 is of a type in which the rear axle 15 is fixed in bracket plates 16 at the rear of the frame 17, the frame being unsprung. The motorcycle shown in Figs. 4 to 6 is of the type in which the rear axle 18 is carried at the end of an arm 19 from which the frame 20 is supported by a combination spring and shock absorber 21. In such an arrangement, the frame is sprung. As best shown in Fig. 6, the frame is provided behind the seat post 22 with laterally offset arms 23 and 24 to which the shock absorbers 21 are attached and to which there are also attached rearward extensions at 25 and 26 to which the rear wheel fender 27 is fastened.

As indicated above, it is one of the objects of this invention to provide luggage carrier means which, except for the mounting brackets, may be interchangeably used with motorcycles of these widely differing types. One of the brackets used with such a motorcycle as that shown in Figs. 1 to 3 is separately illustrated in Figs. 8 and 11. This bracket, generically designated by reference character 30, comprises an upright post at 31 having a cross bar 32 at its upper end. At a point near its lower end, an arm 33 extends rearwardly with an outwardly projecting finger at 34. From an intermediate point on the post 31, an arm 35 extends forwardly and at an upward angle, its outer end being provided with an outwardly turned finger at 36.

The bracket plate 16 which is mounted on the rear axle 15 as above described is provided with outwardly projecting threaded studs at 37 and 38 as clearly shown in Figs. 1 and 8. These are normally used to attach a motorcycle sidecar. They are here used to mount the entire luggage carrier bracket 30 at the left side of the vehicle, and its counterpart at the right side. Holes are provided at 39 and 40 (Fig. 11) to receive these studs 37 and 38 and the nuts thereon to securely position the bracket as shown in Fig. 8 along with its fingers 34 and 36 projecting laterally to receive and support the luggage receptacle hereinafter to be described.

The bracket arrangement used with a motorcycle of the type shown in Figs. 4 to 6 is separately illustrated in Fig. 12. It comprises a pair of U-shaped bars at 42 and 43. The former is bodily inclined in a forward direction as shown in Figs. 4 and 12, while the latter may have intermediate portions disposed at a downward and forward inclination, the leg portions 44 and 45 being thence inclined rearwardly. These bars are provided at their ends with outstanding fingers at 46 and 47, 48 and 49. The two bars span fender 27 as clearly shown in Figs. 4 to 6 and are connected to each other by straps 50 welded to their outer sides and by straps 51 welded to their inner sides. The straps 51 have holes 52 whereby they are bolted to the rearward frame extensions 25 and 26 as best shown in Fig. 4 and Fig. 5. The straps 50 of this carrier, and the strap 32 of the carrier 30 in Fig. 11 have like studs at 53 at uniform spacings for saddle bag mounting so that a saddlebag may interchangeably be placed on either carrier.

An individual saddlebag is illustrated in Figs. 7 to 10. As above stated, it comprises three separately molded pieces. The inner and outside receptacle pieces 55 and 56 (Fig. 8) have margins 57 and 58 telescopically lapped from the front of the receptacle downwardly along the length of the bottom and up and around the protuberant rear portion 59 thereof. The lapping margins are anchored by rivets or the like at 60 which not only pass through the molded components 55 and 56 but also pass through a reenforcing strap 61 lying over the lapping margins of the components from one end substantially to the other thereof, as is apparent in Fig. 7. At its forward end, the strap 61 is reversely curved at 62 to provide an eye into which the arm portions 36 of the carrier bracket 30 (Fig. 11) or arm portions 46 of the bracket of Fig. 12 are interchangeably receivable. At a lower and rearward point, as also shown in Fig. 7, there is welded to this strap a transverse sleeve 64 which is alternatively adapted to receive either the arm portion 34 of bracket 30 (Fig. 11) or the corresponding arm 48 of the bracket shown in Fig. 12.

The inner component part of the receptacle is provided with apertures 65 to receive the studs 53 of the respective brackets. Adjacent portions of the inner component part 55 of the receptacle are reenforced by correspondingly apertured inner and outer straps 66, 67 riveted to each other through the receptacle wall, as clearly appears in Fig. 10. To the innermost strap 67 there is riveted a leaf spring 68 having free end portions at 69 likewise apertured in registry with the studs 53. Fig. 10 shows the manner in which one end portion of the leaf spring 68 is engaged over the forward stud and anchored by a cotter pin 70 tethered to the reenforcing strap 67 and which, in Fig. 10, has been passed through the hole 71 with which the stud 53 is provided. The corresponding cotter pin 72 has not been engaged in its corresponding opening 71 and accordingly the rear end of spring 69 is still free.

The arrangement described provides a quick, convenient and secure means of detachably mounting the saddlebag. The leaf spring not only takes up the play between the mounted parts but, due to its reaction against the cotter pin, it frictionally positions the pin against any possibility of release from its aperture. Yet it requires but a moment to withdraw the tethered pins 70 and 72 from the mounting studs 53, thereby leaving the saddlebag completely free save for disengagement of its lower end from the supporting bracket fingers or arms, on which the use of similar cotter pins is optional, since these arms are primarily for support and the upper studs are primarily for permanence of connection.

The upper margin of the receptacle is entirely encircled by a reenforcing metal strap 75, as best shown in Figs. 1, 8 and 9. It is so attached by rivets 76 as to project substantially above the upper edge of the receptacle in the manner shown in Fig. 9.

The lower margin 77 of the integrally molded cover or closure 78 is desirably formed with an outward offset from the otherwise registering planes in which corresponding wall portions of the receptacle and the closure are disposed. The margin 77 has a metallic interior band 79 of reenforcement which is riveted thereto upon an intervening packing 80 upon which the top margin of strap 75 seats midway between the closure end 77 and the lower edge of the reenforcing band 79. This arrangement provides an excellent seal without requiring any close fitting of the parts.

Near its rear end, the closure 78 is provided with a spring hook 82 which curves downwardly and rearwardly within the receptacle as best shown in Fig. 7. At its forward end, a conventional trunk catch 83 may be used to secure the closure. No other connection is required.

Reference has been made to the fact that the component parts of the saddlebag or luggage container are molded. While they may be pressed of sheet metal, it is greatly preferred that they be molded from some plastic composition, whereby they will tend to damp vibrations and to resist denting and scratching. It has been found appropriate to make these molded parts in relatively heavy weights of materials appropriate for artificial leather.

Saddlebags made and mounted as herein disclosed have their closures fully exposed and independently movable to give prompt and convenient access to the contents of the receptacles, the contents being nevertheless completely protected against loss or damage from dust or rain. Upon arriving at destination, either or both of the saddlebags may be almost instantly removed by withdrawing the tethered cotter pins 70, 72, from their respective mounting studs, and thereupon slipping the eyes 62 and 64 from the supporting finger arms. The saddlebag may then be carried like any other luggage and restored to place on the cycle with equal facility whenever desired. Any given saddlebag is also readily interchangeable between cycles of different types having carrying brackets constructed in accordance herewith.

I claim:

1. A luggage carrier for cycle mounting comprising the combination with a bracket having in unitary assembly for unitary mounting to a cycle laterally projecting support means at one level, mounting stud means at another level and bracket means connecting said support means and said stud means, of a container having support means complementary to the bracket support means and having a side wall apertured in registry with said stud means, said support means, bracket and container being telescopically engaged and laterally movable for disengagement, the stud means being provided within the container with releasable means for anchoring the container upon the stud means.

2. The device of claim 1 in which the container wall is internally provided with leaf spring means biased away from said wall and apertured to receive said stud means when the latter project through the aperture of the wall, together with a key releasably engaged with the stud means and releasably anchoring the biased spring portion of the spring means and constituting the means for anchoring the container on the stud means.

3. The device of claim 1 in which said container comprises right and lefthand molded parts having telescopically lapping margins and a reenforcing strap connected to said parts at said margins and having laterally elongated eyes aligned with the laterally projecting support means on the bracket and providing the containing support means aforesaid.

4. The device of claim 1 in which the container wall providing the stud-receiving apertures is provided with metal reenforcement for said wall and a leaf spring apertured in registry with the wall apertures, said leaf spring having portions provided with a bias inwardly from said wall and engaged by said releasable means in opposition to said bias.

5. The device of claim 1 in which said bracket comprises a generally upright post having a transverse bar near its top provided with laterally projecting mounting studs and provided at a lower level with arms having laterally projecting portions in positions to support said carrier, said upright post being apertured to receive frame mounted bolts.

6. The device of claim 1 in which said bracket comprises a pair of U-shaped arms spaced fore and aft from each other and provided with laterally projecting arm portions, the U-shaped arms being respectively provided above their laterally projecting arm portions with connecting straps having laterally projecting mounting studs, and the said arms being further provided with means for motorcycle frame attachment.

7. An elongated motorcycle saddlebag comprising a receptacle portion and a closure portion, said portions being provided with complementary rims and means adjacent said rims for sealing said portions in the closed position thereof, said receptacle portion having an end wall portion outwardly offset from its said rim, said closure portion being provided with a hook projecting beyond one of its ends into the receptacle portion and beyond said complementary rims for engagement with the offset wall portion of the receptacle, and a luggage catch at its opposite end, said hook and luggage catch comprising sole means for connecting the closure portions to the receptacle portion whereby upon release of the luggage catch the closure portion may be completely removed from said receptacle portion.

8. In a device of the character described, a luggage carrier bracket for mounting to a motorcycle frame independently of any fender mounted thereon, and having means for connection to a saddlebag, said bracket comprising a generally upright post provided with means adapted to secure said post to a portion of the frame of the motorcycle and having a transverse bar near its top and further provided with laterally projecting mounting studs, said post having at a lower level arms having laterally projecting finger portions, said studs and finger portions comprising means for supporting and locking said saddlebag thereon.

9. In a device of the character described, a luggage carrier bracket for application to a motorcycle having a frame and a fender, said bracket comprising a pair of U-shaped arms spaced fore and aft from each other and provided at their ends with laterally projecting arm portions and intermediate their ends with connecting straps bowed to clear the motorcycle fender, straps connecting said arms, said straps having laterally projecting mounting studs, said laterally projecting arm portions and mounting studs comprising means for supporting and locking a saddlebag thereon, said arms being further provided with means for supporting said bracket from said motorcycle frame independently of its fender.

References Cited in the file of this patent

UNITED STATES PATENTS

| | | |
|---|---|---|
| 862,746 | Martin | Aug. 6, 1907 |
| 1,065,667 | Donnell | June 24, 1913 |
| 1,331,874 | Priest | Feb. 24, 1920 |
| 1,784,551 | Smith | Dec. 9, 1930 |
| 1,923,939 | Lavarack | Aug. 22, 1933 |
| 2,359,054 | Schonitzer et al. | Sept. 26, 1944 |
| 2,423,003 | Buegeleisen | June 24, 1947 |
| 2,527,433 | La Rochelle | Oct. 24, 1950 |
| 2,539,381 | Bachman | Jan. 30, 1951 |
| 2,636,652 | Foringer | Apr. 28, 1953 |
| 2,679,945 | Cahill | June 1, 1954 |
| 2,705,575 | Hammer | Apr. 5, 1955 |

FOREIGN PATENTS

| | | |
|---|---|---|
| 446,331 | Great Britain | Apr. 28, 1936 |
| 63,797 | Denmark | July 23, 1945 |
| 584,835 | Great Britain | Jan. 23, 1947 |